Patented Aug. 10, 1943

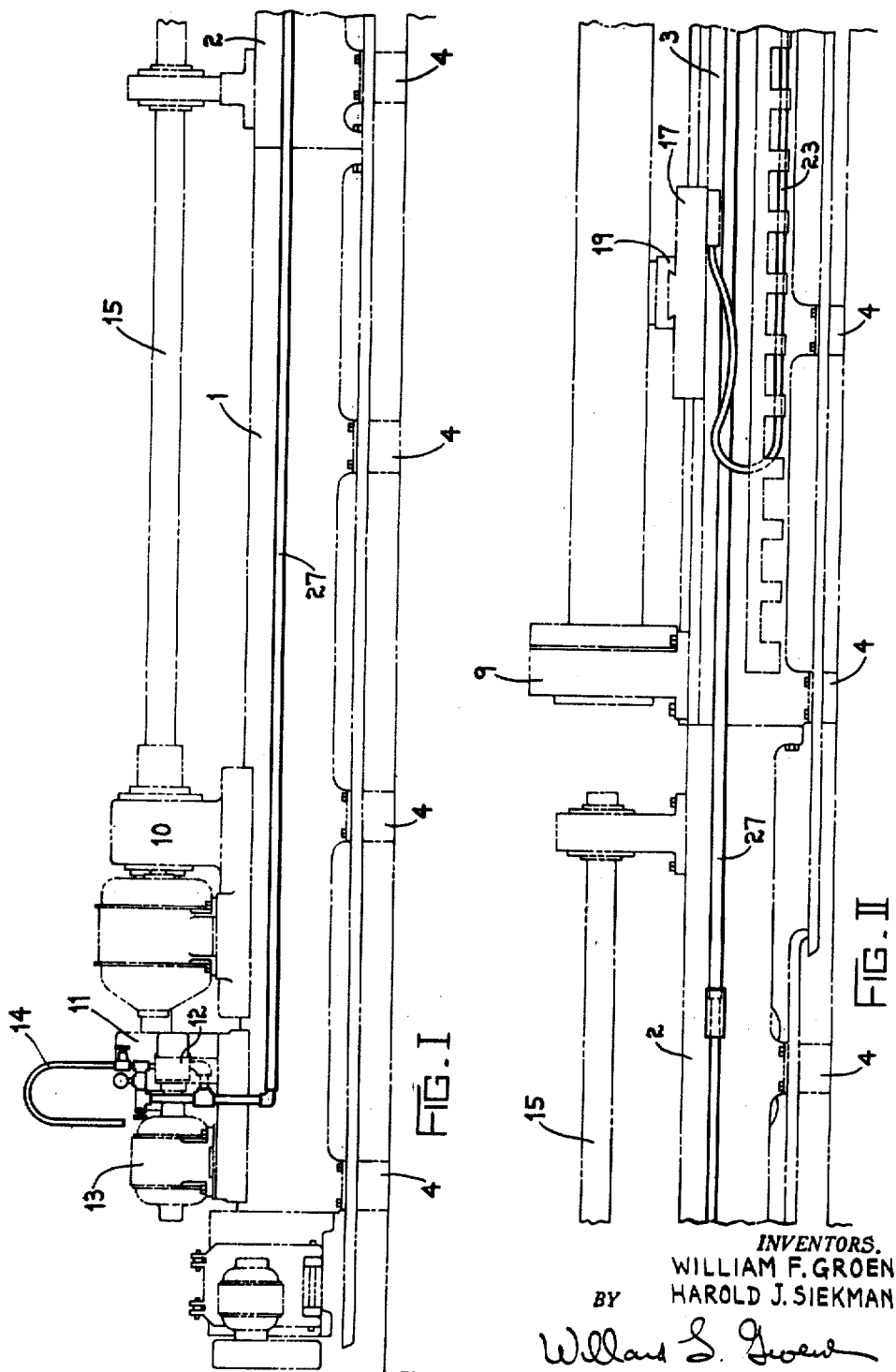

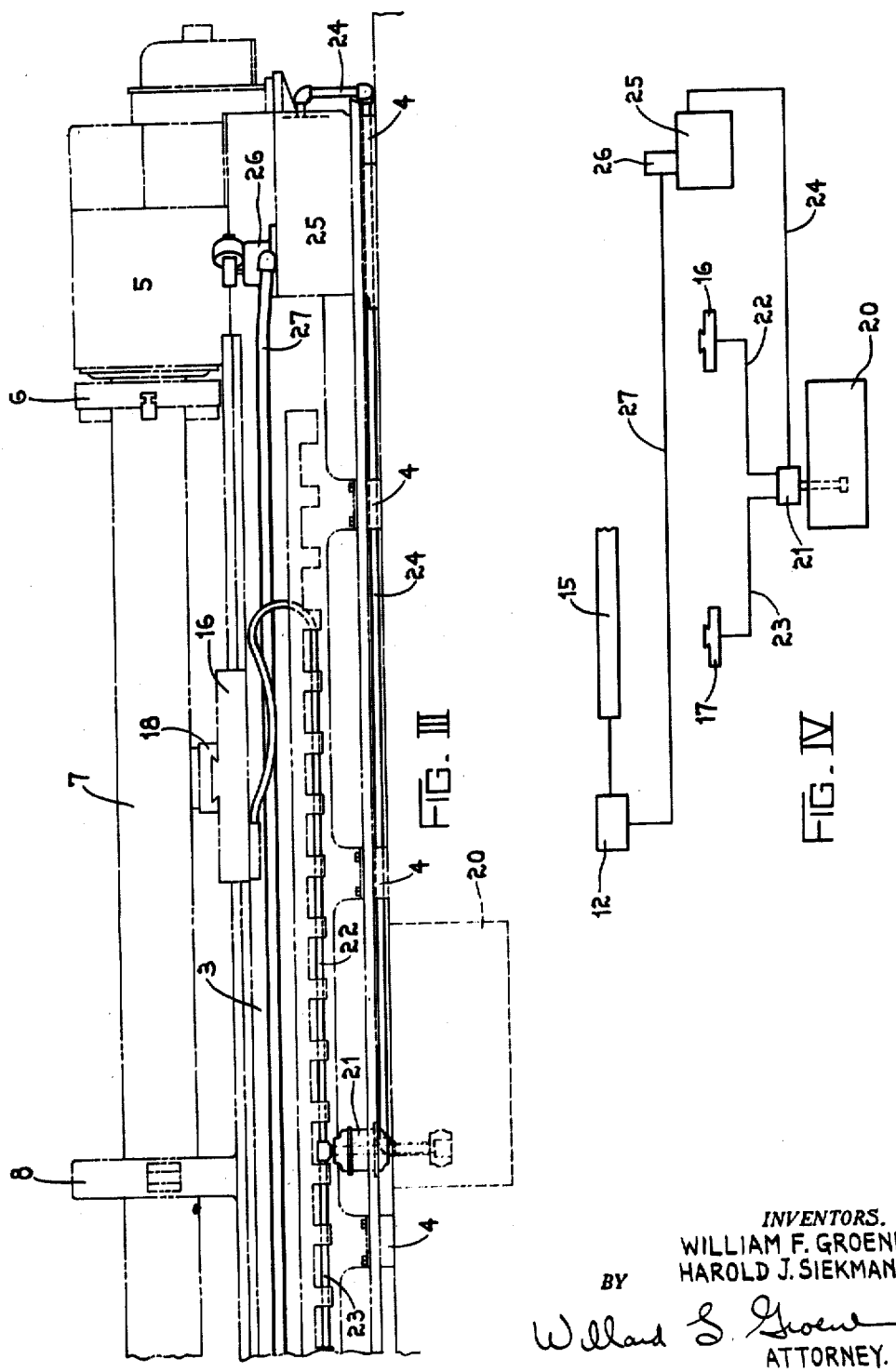

2,326,638

UNITED STATES PATENT OFFICE 2,326,638

MACHINE TOOL COOLANT SYSTEM

William F. Groene and Harold J. Sickmann, Cincinnati, Ohio, assignors to The R. K. Le Blond Machine Tool Company, Cincinnati, Ohio, a corporation of Delaware Application November 30, 1942, Serial No. 467,284

2 Claims. (Cl. 29—27)

This invention pertains to machine tool coolant systems and is particularly related to lathes for combined turning and boring of relatively long tubular work pieces such as gun barrels or the like.

In the simultaneous boring and turning of work pieces of the character of gun tools the problem of supplying coolant is complicated by the fact that the cutting tools on the turning carriages for machining the outside of such tubes requires coolant to be distributed at relatively low pressure and high volume to the turning tools, while the boring tools operating in the boring bar inside of the bore of the tube must be supplied with coolant at relatively high pressure and lower volume so as not only to adequately cool the boring tool but also to effect the forcing out of the chips removed in the bore of the tube with sufficient high pressure to make sure of their discharge from the end of the hole being bored in the tube. Thus two distinctly different considerations must be had, namely that of providing relatively low pressure high volume coolant fluid to the turning tool while at the same time providing low volume high pressure coolant for the boring tool operating inside of the tube being machined. It is a further object to accomplish this simultaneous application of the coolant to both the boring and turning tool from a single source of supply and with a simplified system of coolant distribution to effect the most efficient operation of the various cutting tools operating simultaneously.

One of the objects of this invention to accomplish this result is to provide a basic storage reservoir for the coolant for the machine in which is operated a low pressure high volume coolant distributing pump which directly transmits coolant through appropriate conduits to the turning tool slide where it is applied to the various turning tools operating on the outside of the work piece being machined. It is also a further object to provide a high pressure low volume pump movable directly with the boring bar and directly connected to the coolant distributing passages in it which serves low pressure high volume coolant to the cutting tool on the end of the boring bar operating inside of the work piece. It is then the object to provide a supercharging arrangement whereby the low pressure high volume coolant pump for the turning tool carriages also supplies the supercharged pressure to the high pressure pump for the boring bar. It is also an object to provide in connection with the supercharging arrangement for the high pressure pump a pump operating under pressure which is adapted to prevent any sediment, foreign matter, or chips from passing to the high pressure pump for the boring bar and to incorporate in conjunction with this pump a suitable filter to further safeguard this supercharging circuit from foreign matter.

In the drawings

Figure I is a front elevational view of the left hand portion of a combined gun boring and turning lathe particularly showing the boring bar carriage with coolant pump mounted thereon.

Figure II is a front elevational view of the central portion of said lathe showing one of the turning carriages mounted on the central head portions thereof.

Figure III is a front elevational view of the right hand end of the lathe showing the headstock driving transmission and the other of the turning tool carriages.

Figure IV is a diagrammatic circuit diagram of the hookup of the coolant supply system.

This particular coolant system is especially adapted for application to a gun boring lathe comprising bed portions 1, 2, and 3 appropriately mounted on suitable legs 4 and bolted together lengthwise so as to form a substantially continuous integral bed portion for the entire machine. On the right hand end of the bed 3 shown in Figure III is the lathe headstock 5 having an appropriate chuck 6 which grips a work piece or gun barrel 7 to be turned and bored. The work 7 is appropriately supported in suitable steady rests 8 and 9 mounted on the bed 3. On the left hand end of this lathe assembly, as shown in Figures I and II, is mounted the boring bar carriage 10 and the supplemental carriage 11 carrying the high pressure low volume coolant pressure pump valve which is driven by a motor 13 and supplies coolant through a line 14 to the boring bar 15 of the boring bar carriage 10.

On the bed 3 is mounted the turning carriages 16 and 17 as best seen in Figures II and III respectively which have appropriate cutting tools mounted on slides 18 and 19 respectively for machining the outside portion of the work piece 7.

The primary source for coolant for both the boring bar 15 and its tools and the carriages 16 and 17 and their tools is derived from a main storage reservoir or tank 20 as seen in Figure III and in which operates a low pressure high volume coolant pump 21 from which coolant is directed through a line 22 to the turning carriage 16 and through a line 23 to the turning carriage 17, from where the coolant of high volume and low pressure is applied to the respective cutting tools on these carriages.

A third line also issues forth from the pump 21 and delivers fluid under relatively low pressure to a sump tank 25 located at the headstock end of the machine as shown in Figure III. This tank is maintained under full fluid pressure and discharge of fluid from said tank takes place through an appropriate filter 26 through the discharge line 27 whereby pressure from the pump 21 supercharges the input side of the high pressure pump 12 for the boring bar so as to maintain this pump at all times in high operating efficiency. The sump 25 is under pressure at all times and with relatively low volume passing through line 24, the sump 25, and line 27 because of the small volumetric capacity of the intake of the pump 12. This will remove substantially all foreign material by settlement and sedimentation and the filter 26 associated with this sump will finally take out the last vestiges of foreign matter which might cause difficulty in the high pressure low volume pump 12 for the boring bar.

Having thus fully set forth and described our invention what we claim as new and desire to secure by United States Letters Patent is:

1. In a machine tool, a bed, a headstock mounted on said bed, means for chucking and rotating a gun barrel or tube in said lathe, turning tool carriages mounted on said bed having cutting tools operating on the outside of said tubes, a boring bar carriage having a boring bar with cutting tools operating inside of the bore of said gun barrel, a low pressure high volume fluid pressure pump connected to supply coolant to said turning tool carriages at relatively high volume and low pressure, a high pressure pump associated with said boring bar, and means for connecting said pump to said boring bar and its cutting tools to supply fluid pressure at high pressure low volume thereto, and means interconnecting said low pressure pump and said high pressure pump so as to effect a supercharging of said high pressure pump by said low pressure pump.

2. In a machine tool, a bed, a headstock mounted on said bed, means for chucking and rotating a gun barrel or tube in said lathe, turning tool carriages mounted on said bed having cutting tools operating on the outside of said tubes, a boring bar carriage having a boring bar with cutting tools operating inside of the bore of said gun barrel, a low pressure high volume fluid pressure pump connected to supply coolant to said turning tool carriages at relatively high volume and low pressure, a high pressure pump associated with said boring bar, and means for connecting said pump to said boring bar and its cutting tools to supply fluid pressure at high pressure low volume thereto, and means interconnecting said low pressure pump and said high pressure pump so as to effect a supercharging of said high pressure pump by said low pressure pump, and filtering means interconnected between said low pressure pump and said high pressure pump to effect elimination of foreign matter from entry in said high pressure pump.

WILLIAM F. GROENE.
HAROLD J. SIEKMANN.